United States Patent [19]

Maxwell

[11] 3,948,656

[45] Apr. 6, 1976

[54] METHOD FOR THE PREPARATION OF PHOTOCONDUCTIVE CdSSe

[75] Inventor: Kenneth H. Maxwell, Palmyra, N.Y.

[73] Assignee: Xerox Corporation, Stamford, Conn.

[22] Filed: May 16, 1974

[21] Appl. No.: 470,491

[52] U.S. Cl. .................. 96/1.5; 252/501; 423/99; 423/101; 423/102; 423/508; 423/511
[51] Int. Cl.² . G03G 5/02; G03G 5/08; C01B 19/00
[58] Field of Search ........ 96/1.5; 423/99, 101, 102, 423/508, 511; 252/501

[56] References Cited
UNITED STATES PATENTS

| | | | |
|---|---|---|---|
| 2,517,594 | 8/1950 | O'Brien | 423/508 |
| 3,151,982 | 10/1964 | Corrsin | 96/1.5 |
| 3,542,526 | 11/1970 | Peterson | 423/508 |
| 3,565,686 | 2/1971 | Babcock et al. | 252/501 X |
| 3,691,104 | 9/1972 | Hanada | 96/1.5 X |
| 3,703,594 | 11/1972 | Shigeaki et al. | 252/501 |
| 3,714,337 | 1/1973 | Garet | 423/508 |

FOREIGN PATENTS OR APPLICATIONS

| | | |
|---|---|---|
| 349,701 | 9/1972 | U.S.S.R. |
| 1,522,603 | 9/1969 | Germany |

*Primary Examiner*—Roland E. Martin, Jr.
*Attorney, Agent, or Firm*—James J. Ralabate; James P. O'Sullivan; Jerome L. Jeffers

[57] ABSTRACT

Disclosed is an improved method for the preparation of CdSSe by the reaction in an aqueous medium of $CdCO_3$ with a soluble metal sulfide and selenium to form a raw cake which is subsequently calcined to form the desired product. During calcination, an inert gas is allowed to flow over the raw cake thereby forming a CdSSe pigment with improved electrical properties for use in electrostatographic copying.

24 Claims, 4 Drawing Figures

METHOD FOR THE PREPARATION OF PHOTOCONDUCTIVE CDSSE

BACKGROUND OF THE INVENTION

This invention relates to electrostatographic copying and more specifically to an improved photosensitive material for use in binder type xerographic photoreceptors.

The art of xerography involves the use of a photoconductive element or plate which is uniformly electrostatically charged in order to sensitize its surface. The plate is then exposed in an imagewise manner to activating electromagnetic radiation which selectively dissipates the charge in the exposed areas of the photoconductive material while leaving behind a latent electrostatic image in the non-exposed areas. This latent electrostatic image may then be developed by depositing a finely divided electroscopic marking material on the surface of the photoconductive material. This concept was originally disclosed by Carlson in U.S. Pat. No. 2,297,691 and is further amplified and described in many related patents.

One type of photoconductive layer used in xerography is disclosed in U.S. Pat. No. 3,121,006 to Middleton and Reynolds which describes a number of binder layers comprising finely divided particles of a photoconductive inorganic compound dispersed in an organic electrically insulating resin binder. In the particular examples of the binder systems described in Middleton et al., the dispersion of photoconductive particles is relatively uniform, such uniformity having been accomplished by thorough mixing of the resin and photoconductive particles. With these uniform dispersions a relatively high volume concentration of photoconductor particles, 40 to 60 and preferably about 50 percent by volume, is normally used to obtain the requisite particle-to-particle contact necessary for rapid discharge.

There is an ongoing need for improved photoconductive materials for use in the above-described binder layer photoreceptors. In the synthesis of group II chalcogenides for employment in binder layer photoreceptors, it is possible to employ well known doping techniques to achieve photosensitivity much greater than that of zinc oxide. These preparation methods require the incorporation into the lattice of small quantities of elements such as copper, chlorine, gallium, aluminum, etc., which is normally accomplished by multiple firing of the materials in the presence of a fluxing or mineralizing agent. Resistive, highly sensitive photoconductors have been prepared in this way, however, this method inherently leads to a relatively large particle size, 1–30 $\mu$, which places severe limitations on the use of these materials in fabricating electrostatographic photoreceptors. This is especially true in terms of the resultant high background density and limited mechanical properties encountered with layers having a high volume loading of photoconductor.

It is well known that group II chalcogenides, e.g. CdSSe, manufactured as pigments are photosensitive and can be utilized in the fabrication of electrostatographic layers. These materials possess the advantage of a particle size which ranges from 0.001 to 1 $\mu$ and are, therefore, eminently more suited to the formulation of xerographic photoreceptors than presently available doped materials. Two major problems have restricted the use of these materials in the past. They are: (1) a comparatively low order of sensitivity as compared to the doped materials and (2) the inability to consistently produce a material having the same electrical characteristics by presently known processes.

Accordingly, it would be desirable, and it is an object of the present invention to provide a novel process for the production of cadmium sulfoselenide pigments which are highly photosensitive and therefore useful as photoconductive materials in electrostatographic copying.

A further object is to provide such a process which produces cadmium sulfoselenide which consistently exhibits characteristics which render it useful for electrostatographic copying.

An additional object is to provide a cadmium sulfoselenide pigment which may be used in the preparation of a binder layer xerographic photoreceptor.

SUMMARY OF THE INVENTION

The present invention is an improved method of preparing CdSSe pigment by the carbonate intermediate process, so called because cadmium carbonate is first precipitated and used in the subsequent stages of the synthesis. The process involves preparing CdSSe by the reaction in aqueous solution of $CdCO_3$ with a soluble metal sulfide and selenium to form a raw cake. The raw cake is subsequently calcined at an elevated temperature to form the desired product. In the process of the present invention, the improvement is provided whereby an inert gas is allowed to flow over the raw cake during calcination.

DETAILED DESCRIPTION

It is disclosed in Russion Pat. No. 349,701 that cadmium sulfoselenide useful as a semiconductor can be produced by the reaction of a cadmium salt with sodium sulfoselenide in aqueous medium. It is stated that quality of pigment can be improved by calcining the material in an inert gas with intensive stirring and preferably in the presence of $BaSO_4$. It has now been discovered that CdSSe having electrical properties which render it highly usefull for use in electrostatographic binder layer photoreceptors can be prepared by the carbonate intermediate process in which the raw cake is calcined in a flow of an inert gas. It is important that the inert gas flow over the calcining material rather than remain in static contact with it since certain gaseous products of the calcination reaction have a deleterious effect on the electrical properties of the pigment.

Photosensitive CdSSe has been made by methods other than the carbonate intermediate process, but none of the materials made by direct synthesis, or varients thereof, are comparable in photodischarge performance to those made by the carbonate route. The reaction stages are:

1. Cadmium Salt (soluble) + Soluble Metal Carbonate → Cadmium Carbonate + Metal Salt.

2. Cadmium Carbonate + Soluble Metal Sulfide (selenium) → Cadmium Sulfide + Selenium + Cadmium Carbonate + Metal Carbonate.

3. Cadmium Sulfide + Selenium + Cadmium Carbonate $\xrightarrow{\Delta}$ Cadmium Sulfoselenide.

Reaction (1) produces a finely divided slurry of cadmium carbonate. Other soluble carbonates such as lithium, potassium, rubidium and cesium as well as ammonium carbonates can be used. Lithium carbonate is less preferred due to its relatively low solubility. After washing, the cadmium carbonate slurry is reacted with a solution of a soluble sulfide, preferably sodium sulfide, in which the appropriate amount of selenium is dissolved. Other alkali metal sulfides as well as ammonium sulfide may be used. The sulfur/selenium ratio in the solution is not the same as in the final product since some sulfur is evolved as sulfur dioxide. This stage produces an intimate mixture of what may be cadmium sulfide, selenium and unreacted cadmium carbonate. This mixture is referred to as the raw cake. The raw cake is then calcined at an elevated temperature whereupon the cadmium sulfoselenide is formed. The product is then washed free of residual cadmium oxide in an acid wash and dried at an elevated temperature to provide the final photoconductive material.

The preparation of $CdS_{0.6}Se_{0.4}$ is more specifically described by the following general example in which the cadmium salt is cadmium chloride.

Cadmium chloride, 1.7 M solution, and sodium carbonate, 1.7 M solution, are reacted by adding the carbonate solution to the cadmium solution with strong agitation to form a $CdCO_3$ slurry.

(1) $CdCl_2 + Na_2CO_3 \rightarrow CdCO_3 + 2\ NaCl$

The pH of the $CdCO_3$ slurry is adjusted to the pH of the water by the addition of additional $CO_3^=$. The slurry is allowed to settle and the clear supernatant liquid removed by decantation. The composition is reslurried by addition of water with agitation and heated to 85°C.

To the $CdCO_3$ slurry is slowly added with agitation a 1.3 molar sodium sulfide solution in which 0.68 moles per liter of elemental selenium has been dissolved and the reaction allowed to go to completion.

(2) $2\ CdCO_3 + Na_2S + Se \rightarrow Na_2CO_3 + \underbrace{CdS + CdCO_3 + Se}_{\text{Raw Cake}}$ This reaction is highly complex. Kinetically it involves the reaction of a solution phase with a solid phase. Chemically it is complex since the products are difficult to define. Cadmium carbonate is certainly present, but whether or not cadmium sulfide and selenium are present in two phases or whether complex anions are involved is not known. The above equation is believed adequate for representing the overall stoichiometry of the reaction.

The resulting slurry is decanted, filtered and dried at 125°C. for 18 hours. The recovered material is calcined in a stream of an inert gas at temperatures of from 300° to 700°C., preferably from 450° to 550°C.

(3) $CdS + CdCO_3 + Se \xrightarrow{\Delta} CdSSe + CO_2 + SO_2$

Reaction times depend on the batch size and temperature and are usually in the range of from ½ to 4 hours.

During calcination the $CdCO_3$ breaks down into CdO and $CO_2$ with the CdO being the reactive species while the $CO_2$ is given off as a gaseous by-product. After calcination, the product is quenched in distilled water and acid washed whereupon it is recovered by filtration and dried.

The primary purpose of the inert gas flow over the calcining material is to reduce the amount of oxygen available for interaction with the CdSSe during its formation and to remove gaseous by-products of the reaction which are detrimental to the electrical properties of the product. Thus, any gas which will not detrimentally react with the calcining material may be used. Typically, the inert gases such as in its stead helium, neon, argon, krypton and xenon may be used in the process of the instant invention. Other gases such as $CO_2$ and $N_2$ are inert for purposes of the invention and may be employed. Hydrogen has been found to be extremely detrimental to the electrical performance of the CdSSe and should be excluded as effectively as possible from the calcining ambient.

The space velocity of the inert gas flow is not critical since even a very slow flow will reduce the ambient oxygen supply to some extent and remove some detrimental reaction by-products thereby improving the electrical properties of the pigment. Maximum space velocity would be limited only by the practicalities of the reactor design provided, however, that the rate of gas flow is not so rapid that the calcining material is cooled below the desired reaction temperature.

A photoconductive binder layer (photoreceptor) is prepared by forming a mixture of the photoconductive CdSSe particles and an insulating organic resin binder. The mixture is dispersed in a suitable liquid carrier and coated onto a substrate whereupon the carrier liquid is allowed to evaporate. The dried layer is then heated to drive off residual solvent and complete any polymerization or curing thereby forming a binder matrix containing photoconductive particles in particle-to-particle contact throughout the thickness of the binder layer. When a thermoplastic resin is used, the dried layer can be heated to fuse the resin particles and thereby form the binder layer.

The insulating resin may comprise any electrically insulating organic resin which can be obtained in or made into particulate form, cast into a film from a dispersion, and later processed to form a smooth continuous binder layer. Typical resins include polysulfones, polyacrylates, polyethylene, polystyrene, polyphenylene sulfide, epoxy resins, polyesters, polyvinyl chloride, polyvinyl fluoride and mixtures thereof.

The mixture of resin and photoconductor particles is dispersed in a liquid carrier which is a composition in which neither constituent is soluble and applied to a substrate to form a xerographic plate, i.e. photoreceptor. The substrate is preferably made of a conductive material such as brass, aluminum, steel or a conductively coated dielectric or insulator. The substrate may be of any convenient thickness, rigid or flexible, and in any desired form such as a sheet, web, belt, plate, cylinder or drum. It may also comprise other materials such as metalized paper, plastic coated with a thin layer of metal such as aluminum or glass coated with a thin layer of chromium or tin oxide. In some instances, the substrate may be an electrical insulator or dielectric. Typically, the thickness of the binder layer should be between 10 and 80 microns although thinner and thicker layers may be used. Additional insulating resins useful in the preparation of binder layers and methods of fabrication are disclosed in U.S. Pat. No. 3,121,066.

In the following examples the photoconductive CdSSe powder is fabricated into a layer for electrostatographic measurement by forming a conventional binder layer in which approximately 50% by volume powder is mixed with a particulate polymer in a suitable dispersing agent. The polymer is polyurethane and the dispersing agent is SC 150, a mixture of chemically inert aromatic hydrocarbons prepared by Buffalo Chemicals and Solvents. The suspension is drawn out on a ground glass plate with a doctor blade using a 5 mil gate thereby leaving, upon evaporation of the solvent, a layer which is approximately 50 $\mu$ thick. The layers formed by this process are heated in an oven at 125°C. for at least 18 hours to complete curing of the polymer.

Figure 1:
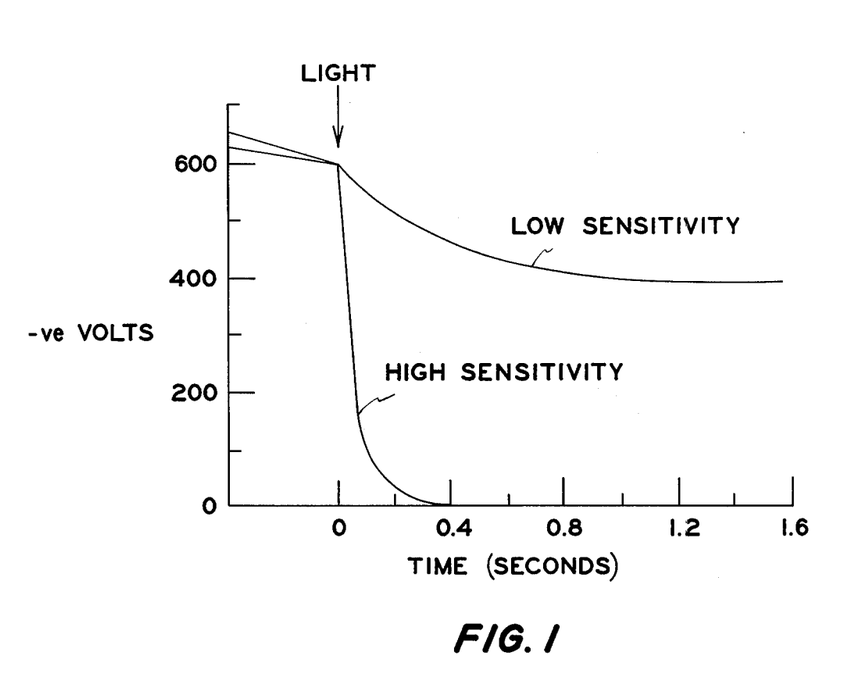
FIG. 1 is an idealized curve of photo-induced discharge characteristics for photoconductors of high and low sensitivity.

The layers are then tested to determine their photo-induced discharge characteristics (PIDC). To accomplish this, the photoconductive layer is charged to $V_o$ in the dark with negative corona and, at zero time, illuminated with light of 5,750 A in wavelength, the intensity being $7.35 \times 10^{12}$ photons/cm.$^2$/sec. The wavelength is close to the band edge value for $CdS_{0.6}Se_{0.4}$ and corresponds to its maximum sensitivity. The decay of voltage with time is recorded with an oscilloscope. The PIDC are determined by plotting voltage as a function of time. FIG. I is an idealized curve of PIDC for photoconductive materials of high and low sensitivity. The highly sensitive material has a high discharge rate and little or no pseudoresidual (tail) whereas the marginally photoconductive material has a low discharge rate and large pseudoresidual. The pseudoresidual is defined arbitrarily as the fraction of the original voltage remaining on the plate a half second after exposure to the light. The term pseudoresidual is used herein since the layers can be discharged with penetrating light. Dark decay is determined from that portion of the curve to the left of the area covered after the light is turned on.

The following CdSSe preparations were carried out in an apparatus built around a tube furnace having a 55 mm outside diameter silica tube running through it. The furnace was constructed so that a ± 1°-2° temperature zone could be maintained over a 30 centimeter area in the middle of the furnace with the temperature being measured by a chromel-alumel thermocouple. Gas handling and monitoring assemblies permitted gas of the desired composition to flow down the tube. Samples of the powders to be calcined were weighed into silica boats and the powder spread loosely and evenly along the boat. The boat could be inserted into and removed from the heated zone by means of a silica rod and hook, the rod passing through a Teflon seal at the end of the tube. The experimental sequence was as follows: after placing the boat plus sample in the tube and replacing the end cap, the entire apparatus was flushed out with argon for ten minutes at a flow rate of 2 to 3 liters per minute. The gas of the desired composition for testing was allowed to flow through the system for a further 30 minutes at a total flow of 200 cc per minute. The sample was then inserted into the furnace where it remained in the reaction zone for the desired time after which period it was removed and cooled for 5 minutes in the gas flow before being taken into air. The sample was then washed with HCl (pH 3) and with deionized water after which it was dried overnight at 120°C.

EXAMPLE I

Samples of cadmium sulfoselenide are prepared and calcined in hydrogen and hydrogen/argon mixtures using the above described apparatus and procedure. The results obtained in pure hydrogen and hydrogen/argon mixtures containing from 50% to as little as 4% hydrogen indicate that the effect of hydrogen on photoconductor performance is catastrophic. Its effect is to produce a material that cannot be charged, presumably due to the high concentration of donors produced. Binder layers having a thickness of 50 $\mu$ made from these powders could be charged to only 20–30 volts.

EXAMPLE II

Figure 2:
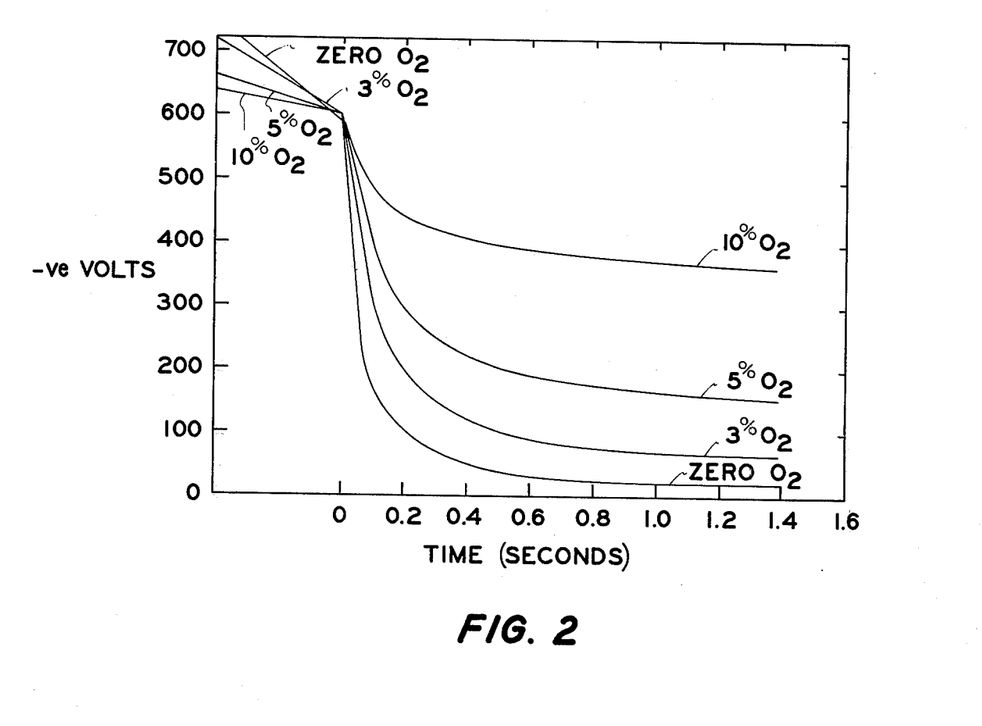
FIGS. 2 and 3 are curves of photo-induced discharge characteristics obtained using CdSSe calcined in pure argon and argon atmospheres containing 3%, 5% and 10% oxygen.
Figure 3:
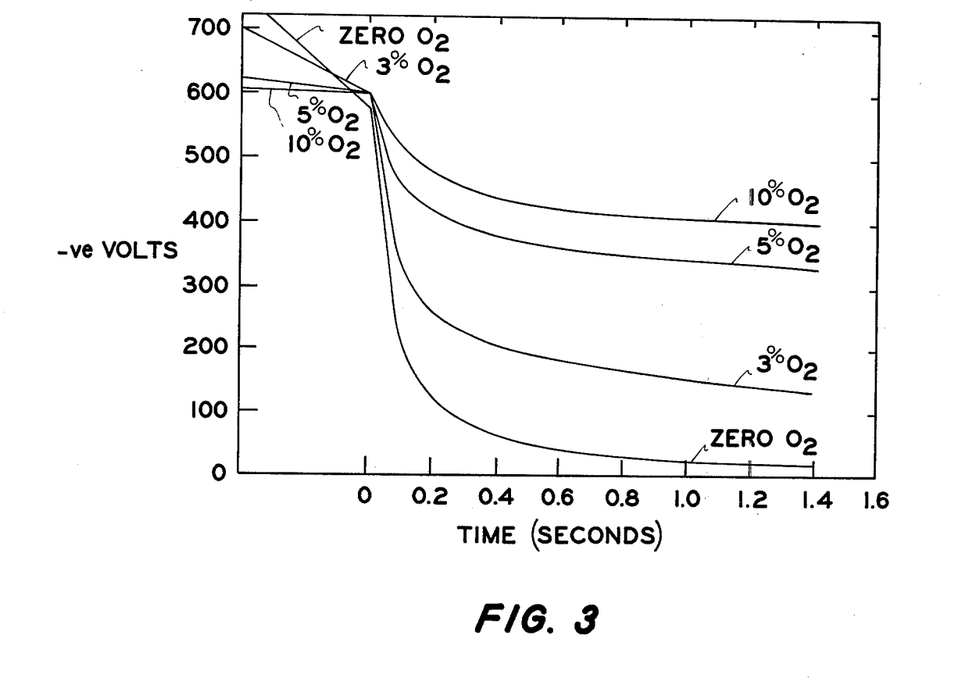

The effects produced by calcining in argon and argon/oxygen mixtures are studied extensively with many materials. The effect of adding small amounts of oxygen to the argon ambient can be observed by reference to FIGS. 2 and 3. The figures show the effect on the PIDC of heating at 525°C. for 30 minutes in pure argon and argon containing 3%, 5% and 10% oxygen. These curves indicate that increasing oxygen partial pressure leads to: (1) decreased dark decay, (2) decreased speed in the light and (3) increased pseudoresidual. It should be noted that, while the trends are similar, the detailed shapes of the curves are different for the two similar materials, particularly at 3% and 5% oxygen concentrations. This is illustrative of a phenomenon seen frequently with cadmium sulfoselenide; while overall trends and effects are often reproducible, the detailed values are not.

EXAMPLE III

Figure 4:
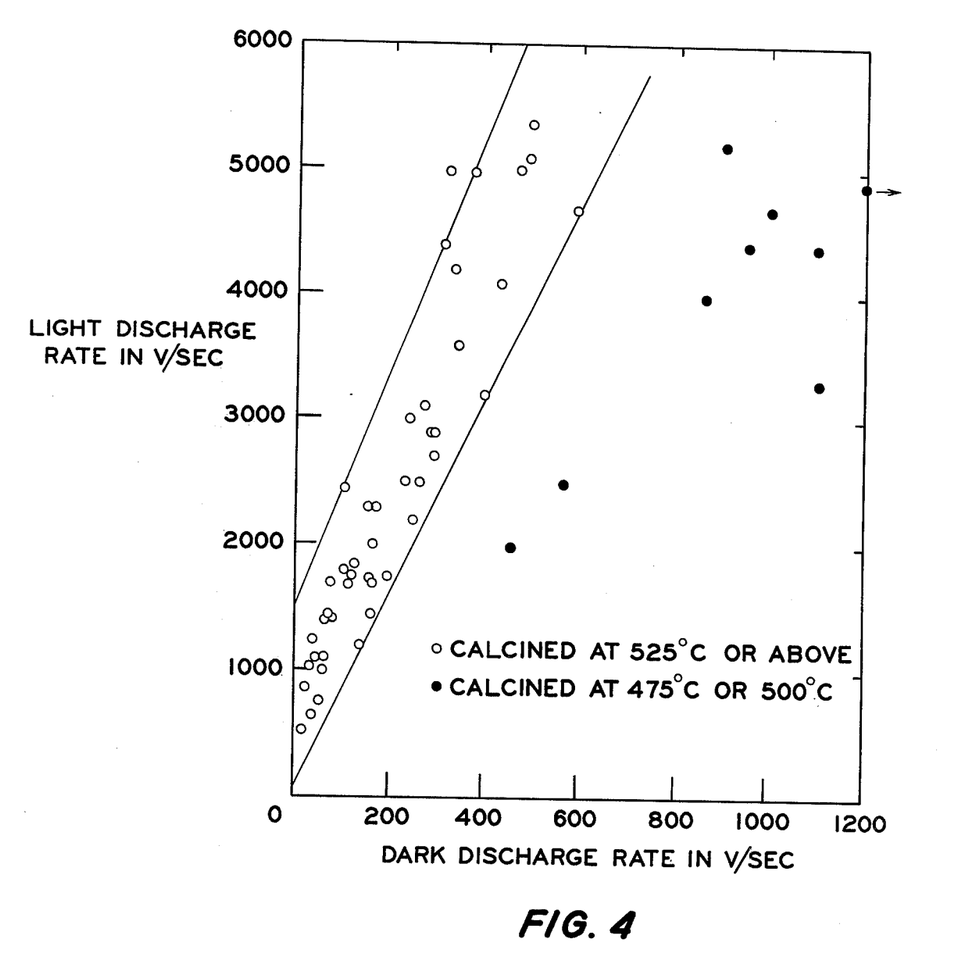
FIG. 4 is a plot of light discharge rate -vs- dark decay obtained using CdSSe calcined at either 475° or 525°C.

A series of experiments is carried out to study the electrical effects of calcining in argon and its mixtures with oxygen. Five raw cakes are employed. The samples are heated at 575°C., 550°C., 525°C. and 500°C. for 30 minutes in pure argon and argon containing 2%, 5% and 10% by volume oxygen. In addition, a few materials are calcined at 475°C. for 30 minutes. After calcining, the pigments are formed into binder layers and their PIDC's measured from $V_o = 600$ volts. FIG. 4 represents a plot of the light discharge rate versus the dark decay. Each point then represents the value of light and dark decay of a particular specimen. From FIG. 4, it can be determined that those materials calcined a the lowest temperatures (500° and 475°C.) lie well to the right of the main group of results. In other words, they exhibit abnormally high dark decays with respect to their light decay compared with those samples calcined at higher temperatures. Thus, in order to produce CdSSe pigments by the process of the instant invention having relatively low dark decays, the use of a calcination temperature of about 525°C. is preferred.

EXAMPLE IV

The effect of oxygen partial pressure on the pseudoresidual is illustrated in Table I for CdSSe products made from calcining 3 raw cakes made using stoichiometric amounts of $CdCO_3$. The trends are clear; increasing the partial pressure of oxygen at any given temperature raises the pseudoresidual. In addition, increasing the temperature at a given partial pressure increases the pseudoresidual. Once again, it should be noted that substantial variations between individual preparations exist and that, while the gross trends are clear, the numerical values are not reproducible. However, it is evident that to produce a fast photoconductor having a low pseudoresidual, oxygen should be excluded from the ambient.

TABLE I

Pseudoresidual Of $CdS_{.6}Se_{.4}$ Pigments As A Function of Oxygen Partial Pressure In The Calcining Ambient

| Sample Number | Partial Pressure Of Oxygen | | Pseudoresidual At A Given Calcining Temperature | | |
|---|---|---|---|---|---|
| | | | 500°C | 525°C | 550°C |
| 1 | zero | $O_2$ | .03 | .05 | .05 |
| | 2% | $O_2$ | .23 | .33 | .42 |
| | 5% | $O_2$ | .28 | .38 | .73 |
| | 10% | $O_2$ | .68 | .80 | .83 |
| 2 | zero | $O_2$ | .03 | .03 | .03 |
| | 2% | $O_2$ | .13 | .20 | .37 |
| | 5% | $O_2$ | .33 | .50 | .70 |
| | 10% | $O_2$ | — | — | .85 |
| 3 | zero | $O_2$ | .02 | 0 | .03 |
| | 2% | $O_2$ | .13 | .20 | .37 |
| | 5% | $O_2$ | .27 | .42 | .60 |
| | 10% | $O_2$ | .62 | .77 | .78 |

EXAMPLE V

The effects of oxygen on pseudoresiduals are seen to be just as marked for the compositions $CdS_{0.35}Se_{0.65}$ and $CdS_{0.2}Se_{0.8}$ as they are for $CdS_{0.6}Se_{0.4}$ by referring to Tables II and III. These pigments are prepared by the general procedure previously described except that the concentrations of $Na_2S$ and Se in the solution to which the cadmium carbonate is added are changed. For example, to prepare $CdS_{0.35}Se_{0.65}$, a solution which is 1.0 molar in $Na_2S$ and 1.0 molar in Se is used whereas a solution which is 0.8 molar in $Na_2S$ and 1.2 molar in Se is used to prepare $CdS_{0.2}Se_{0.8}$.

TABLE II

Pseudoresiduals of $CdS_{.35}Se_{.65}$ Pigments As A Function Of Oxygen In The Calcining Ambient

| Sample | Partial Pressure Of Oxygen | | Pseudoresidual At A Given Calcining Temperature | | |
|---|---|---|---|---|---|
| | | | 475°C | 500°C | 525°C |
| 1 | zero | $O_2$ | 0 | 0 | .05 |
| | 2% | $O_2$ | .07 | .05 | .13 |
| | 5% | $O_2$ | .08 | .07 | .27 |
| | 10% | $O_2$ | .22 | .28 | .42 |
| 2 | zero | $O_2$ | 0 | 0 | .02 |
| | 2% | $O_2$ | .10 | .10 | .18 |
| | 5% | $O_2$ | .22 | .27 | .38 |
| | 10% | $O_2$ | .27 | .43 | .63 |

TABLE III

Pseudoresiduals Of $CdS_{.2}Se_{.8}$ Pigments As A Function Of Oxygen In The Calcining Ambient

| Sample | Partial Pressure | | Pseudoresidual At A Given Calcining Temperature | | |
|---|---|---|---|---|---|
| | | | 475°C | 500°C | 525°C |
| 1 | zero | $O_2$ | .02 | .03 | — |
| | 2% | $O_2$ | .04 | .30 | .25 |
| | 5% | $O_2$ | .38 | .37 | .47 |
| | 10% | $O_2$ | .75 | .65 | — |
| 2 | zero | $O_2$ | .03 | .03 | — |
| | 2% | $O_2$ | .15 | .32 | .21 |
| | 5% | $O_2$ | .58 | .53 | .35 |
| | 10% | $O_2$ | .75 | .75 | .63 |

For a given ambient with the $CdS_{0.2}Se_{0.8}$ preparations, there is no general tendency for the pseudoresidual to rise with temperature, if anything the reverse is true but the scatter is too great to indicate a reliable trend.

EXAMPLE VI

Since the oxygen partial pressure is of such importance in determining electrical properties, an experiment designed to determine whether these effects are peculiar to oxygen is designed. Head to head experiments are conducted in which pigments are calcined at 550°C. in 90% argon/10% $O_2$ and 90% argon/10% Se Vapor (another group VI element). The results of these experiments are set out in Table IV.

TABLE IV

Comparison Of Electrical Effects Of Oxygen And Selenium In Calcining Ambient

| Sample | 90% Argon/10% Se Vapor | | | 90% Argon/10% $O_2$ | | |
|---|---|---|---|---|---|---|
| | Speed v/sec | Dark Decay v/sec | Pseudoresidual | Speed v/sec | Dark Decay v/sec | Pseudoresidual |
| 1 | 720 | 15 | .85 | 650 | 15 | .85 |
| 2 | 850 | 20 | .78 | 850 | 20 | .82 |

From Table IV it can be observed that Se vapor in the calcining ambient has an effect on electrical properties of CdSSe similar to that of oxygen.

EXAMPLE VII

Since carbon dioxide is a gaseous product of the calcination, an experiment is conducted to determine whether or not its concentration influences the electrical properties of the sulfoselenide. Calcinations of a selected number of precipitates are carried out at 525°C. in pure argon and pure carbon dioxide for 30 minutes. The results of this experiment are set out in Table V.

TABLE V

Comparison Of PIDC Data For Calcinations In Argon And Carbon Dioxide

| | Argon | | | Carbon Dioxide | | |
|---|---|---|---|---|---|---|
| Sample | Speed v/sec | Dark Decay v/sec | Pseudoresidual | Speed v/sec | Dark Decay v/sec | Pseudoresidual |
| 1 | 3700 | 290 | .10 | 4100 | 420 | .07 |
| 2 | 2700 | 190 | .25 | 3100 | 290 | .22 |
| 3 | 3400 | 270 | .13 | 3800 | 270 | .12 |
| 4 | 3500 | 290 | .12 | 3100 | 200 | .08 |
| 5 | 3850 | 275 | .12 | 3400 | 340 | .17 |
| 6 | 3200 | 290 | .10 | 3700 | 390 | .13 |

TABLE V-continued

Comparison Of PIDC Data For Calcinations In Argon And Carbon Dioxide

| Sample | Argon | | | Carbon Dioxide | | |
|---|---|---|---|---|---|---|
| | Speed v/sec | Dark Decay v/sec | Pseudoresidual | Speed v/sec | Dark Decay v/sec | Pseudoresidual |
| 7 | 3300 | 220 | .15 | 2900 | 350 | .22 |
| 8 | 3150 | 210 | .15 | 3600 | 270 | .15 |

It can be determined from Table V that carbon dioxide is inert in its effect on the electrical properties of cadmium sulfoselenide since its use leads to materials essentially the same as those calcined in argon.

EXAMPLE VII

An experiment is conducted to determine the effect of $SO_2$, another gas produced during calcination, on the electrical properties of CdSSe. A raw cake is prepared and calcined at 500°C. for one hour in pure argon and in ambients containing 10% and 30% of $SO_2$. The PIDC data are set out in Table VI.

TABLE VI

| Ambient | Speed v/sec | Dark Decay v/sec | Pseudoresidual |
|---|---|---|---|
| 100% Ar | 4170 | 380 | .05 |
| 90% Ar + 10% $SO_2$ | 2500 | 220 | .17 |
| 70% Ar + 30% $SO_2$ | 2500 | 360 | .20 |

The PIDC data indicates that a deterioration in electrical properties results when $SO_2$ was included in the calcining ambient. While not as drastic as for oxygen, it seems clear that $SO_2$ has a detrimental effect on the CdSSe and one that may be relatively independent of concentration since the 10% and 30% $SO_2$ ambients yield materials with virtually identical properties in terms of pseudoresidual.

This experiment, which establishes the beneficial effect of removing $SO_2$ from the calcining ambient, points out the desirability of a flow system for the inert gas as opposed to a static system in which the calcination is carried out in a closed system.

EXAMPLE VIII

The influence of calcining time in argon and in an ambient containing 5% oxygen is determined using raw cakes prepared by the previously described general method. Two samples, sample x and sample y are prepared. Sample y is studied at temperatures of 500°, 525° and 550°C. and sample x is studied at 500°C. The PIDC are listed in Table VII.

TABLE VII

Influence Of Calcining Time On Electrical Properties Ambient-Argon

| Sample | Temp °C | Time Minute | Speed v/sec | Dark Decay v/sec | Pseudoresidual |
|---|---|---|---|---|---|
| y | 500 | 20 | 6200 | 1500 | .02 |
| | 500 | 45 | 6100 | 800 | .02 |
| | 500 | 120 | 5900 | 700 | .04 |
| | 525 | 20 | 5000 | 1200 | .08 |
| | 525 | 45 | 5300 | 800 | .02 |
| | 525 | 120 | 5500 | 480 | .02 |
| | 550 | 20 | 5500 | 480 | .02 |
| | 550 | 45 | 2600 | 250 | .27 |
| | 550 | 120 | charged only to 120 volts | | |
| x | 500 | 30 | 5000 | 1250 | |
| | 500 | 60 | 5000 | 770 | |
| | 500 | 120 | 5000 | 313 | |
| | 500 | 180 | 5000 | 250 | |
| | 500 | 360 | 3440 | 290 | |
| | 500 | 960 | charged only to 100 volts | | |

For sample y at 500° and 525°C. the speed and pseudoresidual are little changed by extended heating at least over the time intervals employed. However, dark decay declined steadily with heating time at these temperatures. The results at 550°C. indicate that there is an optimum time beyond which deterioration of electrical properties takes place. Sample x was calcined at 500°C. in the hopes of spreading out the effects of time. It can be seen for sample x that the speed (at 500°C.) remained constant for the heating time but that there was a steady decrease in dark decay with optimum performance being obtained after about three hours heating. Greater than 3 hours heating caused a decline in photoconductive properties; speed declined after 6 hours heating together with a rise in pseudoresidual. A sample heated overnight for 16 hours could be charged to only 100 volts.

The data of Table VII indicate that a material is initially produced having high intrinsic photosensitivity combined with high dark decay. The latter was reduced steadily by increased heating time until a point was reached where further heating led to deterioration. The final stage was a material with very poor charging characteristics. It appears that, at least to some extent, time and temperature can be traded off to obtain a material having the most desirable electrical properties.

EXAMPLE IX

The effect of heating time and temperature in an ambient containing 95% argon and 5% $O_2$ is determined for the sample designated as sample y in the previous example. The PIDC data obtained is set out in Table VIII.

TABLE VIII

Influence Of Calcining Time On PIDC With Ambient Containing 5% Oxygen

| Temp °C | Time Minute | Speed v/sec | Dark Decay v/sec | Pseudoresidual |
|---|---|---|---|---|
| 500 | 20 | 5300 | 1200 | .07 |
| 500 | 45 | 4700 | 900 | .10 |
| 500 | 120 | 1350 | 150 | .63 |
| 525 | 20 | 5300 | 900 | .05 |
| 525 | 45 | 3100 | 270 | .27 |
| 525 | 120 | 1300 | 70 | .53 |

This data again emphasizes the deleterious effect of oxygen in the calcining ambient especially when longer calcining times are used.

Obvious modifications of the present invention may occur to those skilled in the art. These modifications are intended to be encompassed within the scope of the claims and equivalents thereof.

What is claimed is:

1. In the process of preparing CdSSe by the reaction in an aqueous medium of $CdCO_3$ with a soluble metal sulfide and selenium to form a raw cake with subsequent calcination of the raw cake at a temperature in the range of from 300° to 700°C for a time sufficient to form the desired product, the improvement which comprises providing a flow of an inert gas over the raw cake during calcination.

2. The process of claim 1 wherein the inert gas is selected from the group of helium, neon, argon, krypton and xenon.

3. The process of claim 2 wherein the inert gas is argon.

4. The process of claim 1 wherein the inert gas is carbon dioxide.

5. The process of claim 1 wherein the inert gas is nitrogen.

6. The process of claim 1 wherein the temperature is from 450° to 550°C.

7. The process of claim 1 wherein the metal sulfide is sodium sulfide and the $CdCO_3$ is formed by the reaction of cadmium chloride with sodium carbonate.

8. A finely divided, photoconductive CdSSe pigment having a particle size of from 0.001 to 1 micron suitable for use in a binder layer electrostatographic photoreceptor which is prepared by:
   a. reacting in an aqueous medium $CdCO_3$ with a soluble metal sulfide and selenium to form a raw cake; and
   b. calcining the raw cake at a temperature in the range of from 300° to 700°C for a time sufficient to form the desired product, said preparation being further defined in that an inert gas is provided to flow over the raw cake during calcination.

9. The pigment of claim 8 wherein the inert gas is selected from the group of helium, neon, argon, krypton and xenon.

10. The pigment of claim 9 wherein the inert gas is argon.

11. The pigment of claim 8 wherein the inert gas is carbon dioxide.

12. The pigment of claim 8 wherein the inert gas is nitrogen.

13. The pigment of claim 9 wherein the temperature is from 450° to 550°C.

14. The pigment of claim 8 wherein the metal sulfide is sodium sulfide and the $CdCO_3$ is formed by the reaction of cadmium chloride and sodium carbonate.

15. The pigment of claim 8 dispersed in an electrically insulating organic resin in the form of an electrostatographic photoreceptor comprising a binder matrix containing CdSSe pigment particles in particle-to-particle contact throughout the thickness of binder matrix.

16. The photoreceptor of claim 15 wherein the pigment is present in an amount of about 50 volume percent.

17. A method for the preparation of a binder layer electrostatographic photoreceptor which comprises:
   a. reacting in aqueous $CdCO_3$ with a soluble metal sulfide and selenium to form a raw cake,
   b. calcining the raw cake at a temperature in the range of from 300° to 700°C for a time sufficient to form the desired product to form CdSSe having a particle size of from 0.001 to 1 micron, said reaction being further defined in that an inert gas is provided to flow over the raw cake during calcination,
   c. dispersing the CdSSe with particles of an electrically insulating organic resin in a carrier liquid in which neither the CdSSe nor resin are soluble, the volume ratio of CdSSe particles to particles of the electrically insulating resin being such that particle-to-particle contact of the CdSSe particles is provided,
   d. applying the dispersion to a substrate in the form of an even layer,
   e. removing the carrier fluid, and
   f. processing the resin to form a smooth continuous binder layer on the substrate.

18. The method of claim 17 wherein the inert gas is selected from the group of helium, neon, argon, krypton and xenon.

19. The method of claim 18 wherein the inert gas is argon.

20. The method of claim 17 wherein the inert gas is carbon dioxide.

21. The method of claim 17 wherein the inert gas is nitrogen.

22. The method of claim 19 wherein the calcination temperature is from 450° to 550°C.

23. The method of claim 17 wherein the metal sulfide is sodium sulfide and the $CdCO_3$ is formed by the reaction of cadmium chloride and sodium carbonate.

24. The method of claim 17 wherein the organic resin is a thermoplastic resin and the binder layer is prepared by thermally fusing the resin in step (f).

* * * * *